United States Patent
Hwang (10) Patent No.: US 9,965,629 B2
(45) Date of Patent: May 8, 2018

(54) MALICIOUS CODE INFECTION SYSTEM AND MALICIOUS CODE INFECTION METHOD

(71) Applicant: AHNLAB, INC., Gyeonggi-do (KR)

(72) Inventor: Kyu Beom Hwang, Gyeonggi-do (KR)

(73) Assignee: AHNLAB, INC., Gyeonggi-Do (KR)

( * ) Notice: Subject to any disclaimer, the term of this patent is extended or adjusted under 35 U.S.C. 154(b) by 0 days. days.

(21) Appl. No.: 14/773,461

(22) PCT Filed: Mar. 7, 2014

(86) PCT No.: PCT/KR2014/001898
§ 371 (c)(1),
(2) Date: Sep. 8, 2015

(87) PCT Pub. No.: WO2014/137188
PCT Pub. Date: Sep. 12, 2014

(65) Prior Publication Data
US 2016/0026795 A1    Jan. 28, 2016

(30) Foreign Application Priority Data
Mar. 7, 2013  (KR) .......... 10-2013-0024432

(51) Int. Cl.
*G06F 21/00* (2013.01)
*G06F 21/56* (2013.01)

(52) U.S. Cl.
CPC ................ *G06F 21/562* (2013.01)

(58) Field of Classification Search
CPC .......................................... G06F 21/55–21/56
USPC ....................................... 726/22–25
See application file for complete search history.

(56) References Cited

U.S. PATENT DOCUMENTS

| | | | |
|---|---|---|---|
| 2009/0064328 A1* | 3/2009 | Ahn | H04L 63/1416 726/22 |
| 2012/0079573 A1* | 3/2012 | Sagawa | G06F 21/46 726/6 |

* cited by examiner

*Primary Examiner* — Anthony Brown
(74) *Attorney, Agent, or Firm* — Bacon & Thomas, PLLC (57) ABSTRACT

Provided are a malicious code diagnosing system and a method of diagnosing malicious codes. According to embodiments of the present disclosure, a malicious code diagnosing operation is performed only on files that are likely to be infected by malicious codes by utilizing file change log information recorded in a file system. Accordingly, malicious code diagnosing operation can be performed more quickly and reliably than conventional diagnosing method.

11 Claims, 2 Drawing Sheets

Fig. 2

MALICIOUS CODE INFECTION SYSTEM AND MALICIOUS CODE INFECTION METHOD

TECHNICAL FIELD

The present disclosure relates to techniques for efficiently diagnosing malicious code with respect to the file system of a computer more quickly and reliably than conventional diagnosing methods.

BACKGROUND ART

In the related art, diagnosing malicious codes in a file system of a computer system is typically performed by searching for files directory by directory and diagnosing the files.

According to the conventional method of diagnosing malicious codes, since all files are searched for and diagnosed directory by directory, an infection may be diagnosed after a long period of time depending on the location of the infection. Furthermore, since there are a large number of files in a file system, it takes a significant time period to perform a malicious code diagnosing operation, e.g., dozens of minutes to several hours.

Here, to overcome the time-consuming problem, it is conceivable to perform diagnosing operation only on some directories (e.g., Windows, System, etc.). Although this approach may reduce diagnosing time period, it is not possible to detect a malicious code infection at a location other than significant folders, that is, some designated directories (e.g., Windows, System, etc.) during a malicious code diagnosing operation. Thus, reliability of the malicious code diagnosing operation is deteriorated.

Incidentally, in a file system, when a modification of a file occurs, such as generation/storage of the file, modification of name or content of the file, and deletion of the file, information regarding the modification is recorded as file change log information.

In view of the above, the present disclosure suggests to perform a malicious code diagnosing operation only on files that are likely to be infected by malicious codes by utilizing file change log information recorded in a file system, thereby overcoming time consumption and low reliability during a quick diagnosis of the conventional diagnosing method while performing a quick and reliable malicious code diagnosing operation.

DETAILED DESCRIPTION OF THE INVENTION

Technical Problem

The present disclosure provides a method of overcoming time consumption and low reliability of a conventional diagnosing method and performing a quick and reliable malicious code diagnosing operation.

Technical Solution

According to a first aspect of the present disclosure, there is provided a method of diagnosing malicious codes, the method including a file change log information checking operation for checking file change log information recorded in a file system in a computer system when a malicious code diagnosing operation is performed on the computer system; a diagnosis target file list generating operation for generating a diagnosis target file list regarding files corresponding to modification events from among all files of the file system based on the file change log information; and a diagnosing operation for performing the malicious code diagnosing operation with respect to only files included in the diagnosis target file list.

According to a second aspect of the present disclosure, there is provided a malicious code diagnosing system including a file change log information checking unit that checks file change log information recorded in a file system in a computer system when a malicious code diagnosing operation is performed on the computer system; a diagnosis target file list generating unit that generates a diagnosis target file list regarding files corresponding to modification events from among all files of the file system based on the file change log information; and a diagnosing unit that performs the malicious code diagnosing operation with respect to only files included in the diagnosis target file list.

Advantageous Effects

According to embodiments of the present disclosure, a malicious code diagnosing operation is performed with respect to not all files of a file system, but only files that are likely be infected by malicious codes. Therefore, time consumption and low reliability of the conventional diagnosing method may be overcome and a quick and reliable malicious code diagnosing operation may be performed.

MODE OF THE INVENTION

Although a few embodiments of the present disclosure have been shown and described, it would be appreciated by those skilled in the art that changes may be made in these exemplary embodiments without departing from the principles and spirit of the present disclosure, the scope of which is defined in the claims and their equivalents.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout the drawings. As used herein, the term "and/or" includes any and all combinations of one or more of the associated listed items. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be described in detail by explaining preferred embodiments of the present disclosure with reference to the attached drawings.

First, referring to FIG. 1, a malicious code diagnosing system according to an embodiment of the present disclosure will be described.

Figure 1:
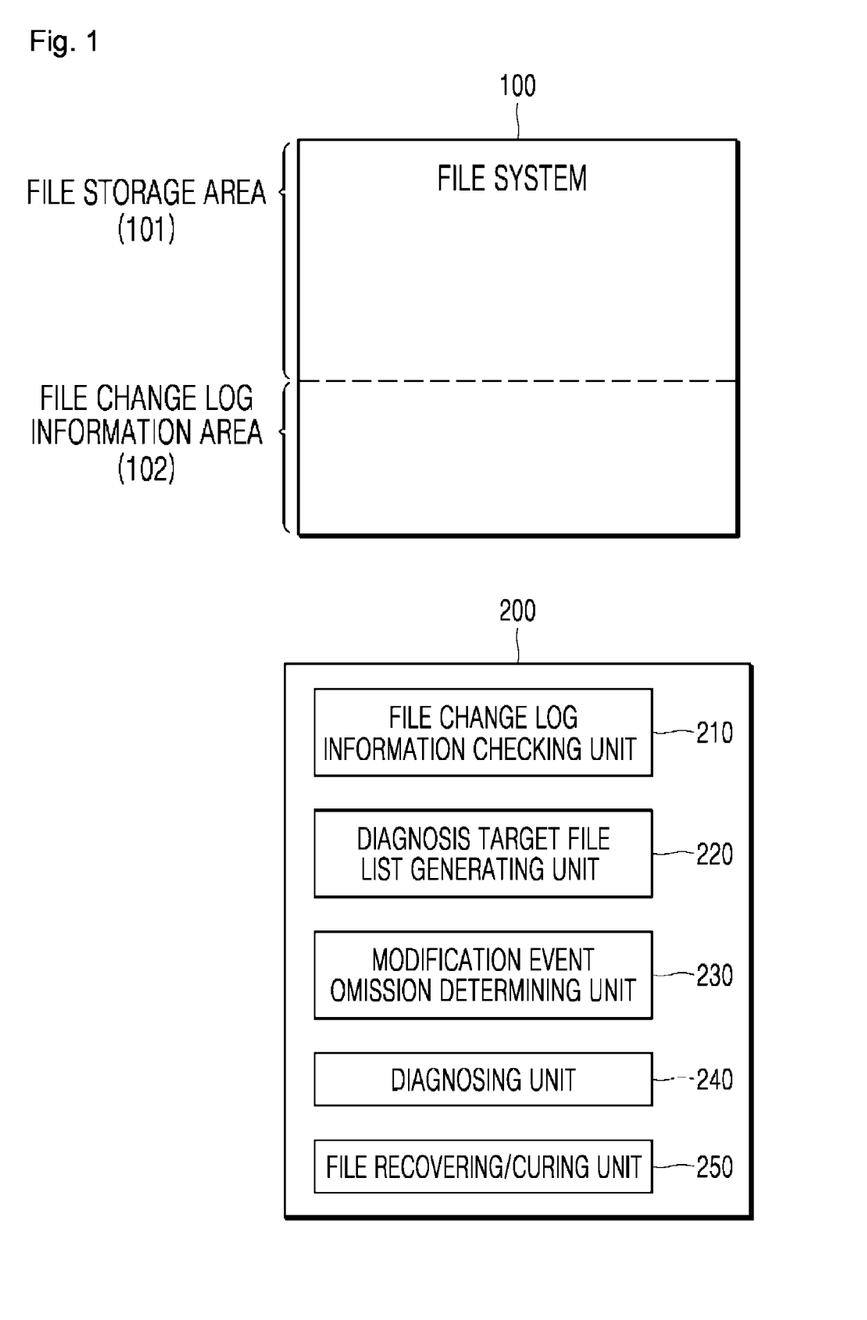
FIG. 1 is a diagram showing the overall configuration of a malicious code diagnosing system according to an exemplary embodiment of the present disclosure.

As shown in FIG. 1, a malicious code diagnosing system 200 includes: a file change log information checking unit 210 that, when a malicious code diagnosing operation is initiated on a computer system (not shown), checks file change log information recorded in a file system 100 of the computer system (not shown); a diagnosis target file list generating unit 220 that generates a diagnosis target file list regarding files corresponding to modification events from among all files of the file system 100; and a diagnosing unit 240 that diagnoses malicious codes with respect to files included in the diagnosis target file list.

The file system 100 of the computer system (not shown) includes a file storage area 101 in which a number of files are stored.

Furthermore, in the file system 100, there is a file change log information area 102, in which, when a modification occurs, such as generation and storage of a new file in the file storage area 101, modification of information regarding an existing file (e.g., name, size, time), or deletion of an existing file, information regarding modification events is recorded as a file change log information.

Generally, such file change log information is information including at least one of log identification information, log information, and file identification information regarding a file at which a corresponding modification occurred is mapped to at least one modification event that occurred in the file system 100.

In detail, log information and file identification information to recover a file when an error occurs are recorded in file change log information, and log identification information for tracing log information is further recorded.

The log identification information may be, in the case of the NTFS file system, a log sequence number (LSN) of a meta file table (MFT), where a difference between LSNs regarding successive events will be within a preset difference range designated by a log identification information designating algorithm.

Furthermore, file identification information is referred to as a File ID and, in the case of the NTFS file system, may be a FRN (file reference number), which is a sequence number of a file stored in a MFT area.

Furthermore, log information may include at least one of information regarding a modification event occurred with respect to a corresponding file (e.g., generation, modification of file-related information (e.g., name, size, time, etc.), modification of file content, deletion, etc.), information regarding time of occurrence of the modification events, information regarding name of the corresponding file (e.g., before the modification), information regarding location of the corresponding file (e.g., before the modification), information regarding size of the corresponding file (e.g., before the modification), and information regarding a subject of the modification event.

Hereinafter, for convenience of explanation, log identification information and log information regarding a modification event and file identification information will be referred to as file change log information regarding the modification event.

Meanwhile, the general pattern of malicious activities carried out by a malicious code in a computer system (not shown) is that the malicious code is generated and stored as a malicious code file in the file storage area 101 of the file system 100 and modifies target files (modifies names or contents thereof or deletes the same) from among files stored in the file storage area 101, where, after the target files are modified, the malicious code file may also modify itself (modify name or content thereof or delete the same).

Therefore, in the present disclosure, based on the fact that malicious activities of malicious codes generally cause modification events regarding files, only files that are likely be infected by malicious codes are diagnosed for malicious codes by utilizing file change log information in the file system 100.

Here, as described above, the malicious code diagnosing system 200 includes the file change log information checking unit 210, the diagnosis target file list generating unit 220, and the diagnosing unit 240.

When a computer system (not shown) is diagnosed for malicious codes, the file change log information checking unit 210 checks file change log information recorded in the file system 100 of the computer system (not shown).

For example, a computer system (not shown) may be diagnosed for malicious codes according to an operation of a user or in a diagnosing period pre-set to a diagnosing engine.

When a computer system (not shown) is diagnosed for malicious codes as described above, the file change log information checking unit 210 may check file change log information recorded in the file change log information area 102 in the file system 100 and provide the file change log information to the diagnosis target file list generating unit 220.

Preferably, the malicious code diagnosing system 200 may store and manage information regarding the last file change log information referred to in a previous malicious code diagnosing operation before a current malicious code diagnosing operation is performed (e.g., the last file change log information checked before the current malicious code diagnosing operation is performed).

Therefore, the file change log information checking unit 210 may exclude modification events regarding files that have been already diagnosed in a previous malicious code diagnosing operation from among modification events included in file change log information recorded in the file change log information area 102 in the file system 100 based on the last file change log information, and provide the rest of the modification events to the diagnosis target file list generating unit 220.

The diagnosis target file list generating unit 220 refers to the file change log information provided by the file change log information checking unit 210 and generates a diagnosis target file list regarding files corresponding to the modification events from among all files of the file system 100.

For example, the diagnosis target file list generating unit 220 adds files corresponding to modification events from among all files of the file system 100 to a diagnosis target file list based on file change log information provided by the file change log information checking unit 210, e.g., file change log information recorded in the file change log information area 102 in the file system 100 from which modification events regarding files that are already diagnosed are excluded at a time of performing a malicious code diagnosing operation.

In detail, based on file change log information, the diagnosis target file list generating unit 220 may check file identification information (e.g., File IDs) of respective modification events included in the file change log information and may generate a diagnosis target file list by using the file identification information (e.g., File IDs) checked with respect to the respective modification events or add the file identification information (e.g., File IDs) checked with respect to the respective modification events to a diagnosis target file list that is generated in advance.

Here, there may be modification events without recorded file change log information (e.g., file IDs) from among the modification events included in the file change log information. Files corresponding to such the modification events will not be included as targets of a malicious code diagnosing operation in a diagnosis target file list generated by the diagnosis target file list generating unit 220.

Here, the malicious code diagnosing system 200 may further include a modification event omission determining unit 230.

The modification event omission determining unit 230 is a function unit that determines whether there is an omitted modification event between a current malicious code diagnosing operation and the last malicious code diagnosing operation before the current malicious code diagnosing operation is performed.

For example, a capacity of the file change log information area 102 of the file system 100 for recording file change log information may be limited.

For example, if a 5001$^{th}$ modification event occurs after file change log information regarding to 5,000 modification events is sequentially recorded in the file change log information area 102 and a capacity of the file change log information area 102 for recording file change log information is exceeded, the file change log information regarding the 5,001$^{th}$ modification event replaces file change log information regarding the earliest modification event.

Therefore, when the last malicious code diagnosing operation is performed, and then a modification event X occurs therby file change log information (log identification information, log information, and file identification information) regarding the modification event X is recorded in the file change log information area 102, and file change log information regarding various modification events occurring thereafter is further recorded in the file change log information area 102 in the file system 100, the previously recorded file change log information regarding the modification event X may be removed. If a current malicious code diagnosing operation is performed thereafter, the file change log information regarding the modification event X does not remain in the file change log information area 102, and thus the modification event X will not be included in a diagnosis target file list and will be omitted.

Therefore, the modification event omission determining unit 230 determine whether there is an omitted modification event between the current malicious code diagnosing operation and the last malicious code diagnosing operation before the current malicious code diagnosing operation in file change log information checked by the file change log information checking unit 210.

In other words, the modification event omission determining unit 230 checks log identification information regarding the earliest modification event in the file change log information currently provided by the file change log information checking unit 210.

Next, the modification event omission determining unit 230 checks log identification information regarding the last modification event in previous file change log information provided by the file change log information checking unit 210 during the last malicious code diagnosing operation before the current malicious code diagnosing operation is performed, that is, the malicious code diagnosing operation just before the current malicious code diagnosing operation.

Next, the modification event omission determining unit 230 may determine whether there is an omitted modification event in the currently provided file change log information between a time point at which the previous malicious code diagnosing operation is performed and a time point at which the current malicious code diagnosing operation is performed by comparing log identification information regarding the earliest modification event of the current file change log information to log identification information regarding the last modification event in the file change log information regarding the malicious code diagnosing operation just before the current malicious code diagnosing operation.

As described above, LSNs of file change log information regarding respective modification events that are recorded in the file change log information area 102 in the order that the modification events occur will be sequentially designated within a difference range designated by a log identification information designating algorithm.

Here, if the LSN regarding the earliest modification event of the current file change log information is a value smaller than the LSN corresponding to the last modification event of the file change log information regarding the malicious code diagnosing operation just before the current malicious code diagnosing operation, LSNs may have been initialized and re-designated according to a log identification information algorithm as file change log information regarding various other modification events are recorded in the file change log information area 102, and thus there may be an omitted modification event between a time point at which the previous malicious code diagnosing operation is performed and a time point at which the current malicious code diagnosing operation is performed.

Alternatively, if the LSN regarding the earliest modification event of the current file change log information is a value greater than the LSN corresponding to the last modification event of the file change log information regarding the malicious code diagnosing operation just before the current malicious code diagnosing operation and the difference therebetween exceeds a pre-set critical difference range, a modification event may be omitted between the time point at which the previous malicious code diagnosing operation is performed and the time point at which the current malicious code diagnosing operation is performed due to an error or a forceful operation while file change log information regarding various other modification events are recorded in the file change log information area 102.

Therefore, if the LSN regarding the earliest modification event of the current file change log information is a value smaller than the LSN corresponding to the last modification event of the file change log information regarding the malicious code diagnosing operation just before the current malicious code diagnosing operation or greater than the LSN corresponding to the last modification event of the file change log information regarding the malicious code diagnosing operation just before the current malicious code diagnosing operation and the difference therebetween exceeds a pre-set critical difference range, the modification event omission determining unit 230 may determine that there is an omitted modification event between the time point at which the previous malicious code diagnosing operation is performed and the time point at which the current malicious code diagnosing operation is performed.

If it is determined that there is an omitted modification event, the modification event omission determining unit 230 obtains log identification information regarding the omitted modification event based on the LSN regarding the earliest modification event in the current file change log information and the LSN regarding the last modification event in the file change log information regarding the malicious code diagnosing operation just before the current malicious code diagnosing operation.

For example, based on a different range designated by a log identification information designating algorithm and the above-stated both LSNs, the modification event omission determining unit 230 may estimate and obtain a LSN regarding the omitted modification event between the both LSNs.

Furthermore, from among all files of the file system 100, the modification event omission determining unit 230 may diagnose files related to the LSN of the omitted modification event obtained as described above and add file identification information (file IDs) regarding the diagnosed files to a diagnosis target file list.

From among the all files of the file system 100, the diagnosing unit 240 diagnoses only files included in the diagnosis target file list for malicious codes.

In other words, from among the all files of the file system 100, the diagnosing unit 240 searches for and diagnoses only files corresponding to respective file identification information (file IDs) included in the diagnosis target file list for malicious codes.

In other words, the diagnosing unit 240 does not diagnose all files of the file system 100 for malicious code, but diagnoses only files corresponding to modifications, such as generation, modification, and deletion, in the file system 100 (moreover, files that are not diagnosed during a previous malicious code diagnosing operation) for malicious code based on a diagnosis target file list regarding the files corresponding to modifications. For example, the diagnosing unit 240 may perform a malicious code is diagnosing operation based on log information mapped to corresponding modification events of the files corresponding to modifications.

Here, the diagnosing unit 240 may diagnose files corresponding to generation and modification from among files included in the diagnosis target file list for malicious code based on log information mapped to the corresponding modification events and cure files that are suspected of being infected by malicious code files.

Meanwhile, the diagnosing unit 240 may diagnose files corresponding to deletion from among the files included in the diagnosis target file list for malicious code based on log information mapped to the corresponding modification events. Moreover, if a file may be partially or completely recovered, the diagnosing unit 240 may diagnose the recovered file for malicious codes.

Here, the malicious code diagnosing system 200 may further include a file recovering/curing unit 250.

The file recovering/curing unit 250 may recover (restore) files that are suspected of being infected by malicious code files and request the diagnosing unit 240 to diagnose the files for malicious codes or may cure the files that are suspected of being infected by malicious code files.

In detail, if a particular file is suspected of being infected by a malicious code file as a result of diagnosing files corresponding to generation and modification from among files included in the diagnosis target file list for malicious codes based on log information mapped to the corresponding modification events, the diagnosing unit 240 requests to the file recovering/curing unit 250 to cure the particular file.

Therefore, the file recovering/curing unit 250 may cure the particular file that the diagnosing unit 240 requested to cure according to a pre-set malicious code curing algorithm.

Meanwhile, if a particular file is suspected of being infected by a malicious code file as a result of diagnosing files corresponding to deletion from among files included in the diagnosis target file list for malicious codes based on log information mapped to the corresponding modification events, the diagnosing unit 240 requests partial or complete recovery of the particular file to the file recovering/curing unit 250.

Therefore, the file recovering/curing unit 250 may partially or completely recover (restore) the particular file that the diagnosing unit 240 requested to recover and request the diagnosing unit 240 to diagnose the recovered file for malicious codes.

In the case of the NTFS, a MFT includes information including a filename, a size, and generated and modified times as well as recovery information regarding the corresponding file. Therefore, if such information is valid, the corresponding file may be recovered by the file recovering/curing unit 250.

Therefore, the diagnosing unit 240 diagnoses the recovered particular file for malicious codes and, if the particular file is diagnosed (determined) as a file deleted by a malicious code, requests the file recovering/curing unit 250 to cure the particular file, so that the file recovering/curing unit 250 cures the particular file according to a pre-set malicious code curing algorithm.

Meanwhile, the diagnosing unit 240 diagnoses the recovered particular file for malicious codes and, if the particular files is diagnosed (determined) as a malicious code file, may request malicious code analysis regarding the particular file to a particular function unit (not shown) to collect a sample to be utilized for an extensive analysis. The reason of recovering a file corresponding to deletion is that, since a malicious code file deleted itself to erase its trace, the corresponding file is recovered to collect a sample to be utilized for an extensive analysis.

Furthermore, if a particular file is diagnosed (determined) as a malicious code file as a result that the diagnosing unit 240 diagnoses a recovered file for malicious codes as described above, the file recovering/curing unit 250 searches for files corresponding to modification events caused by the above-stated particular file based on log information mapped to the respective modification events of the above-stated current file change log information.

Next, the file recovering/curing unit 250 recovers found files by using log information regarding the found file, thereby recovering and curing files modified (generated, modified, or deleted) by the particular file, which is a malicious code file.

For example, it is assumed that, as a result of performing a malicious code diagnosing operation, a particular file A is diagnosed as a malicious code file and, as a result of searching for files corresponding to modification events caused by the file A based on log information mapped to the respective modification events of the above-stated current file change log information, a file B and a file C have been found.

Log information in file change log information regarding the file B may include information regarding type of a corresponding modification event (e.g., deletion), information regarding name of the file B (e.g., before the modification), information regarding location of the file B (e.g., before the modification), and information regarding size of the file B (e.g., before the modification), and information regarding the subject (the file A) of the modification event.

Furthermore, log information in file change log information regarding the file C may include information regarding type of a corresponding modification event (e.g., filename modification), information regarding name of the file C (e.g., before the modification), information regarding location of the file C (e.g., before the modification), and information regarding size of the file C (e.g., before the modification), and information regarding the subject (the file A) of the modification event.

In this case, the file recovering/curing unit 250 may recover the file B deleted by the malicious code file A by using the log information regarding the found files B and C, modify filename of the file C, which is modified by the malicious code file A, to the filename before the modification, and, if necessary, cure the files B and C.

As described above, the malicious code diagnosing system 200 according to the present disclosure may perform a quick and reliable malicious code diagnosing operation with respect to only files that are likely to be infested by malicious codes by generating a diagnosis target file list regarding only files corresponding to modifications in the file system 100, such as modification of file-related information, generation of files, modification of files, and deletion of files, by utilizing file change log information recorded in the file system 100 and diagnosing only the files corresponding to the modifications for malicious code instead of diagnosing all files of the file system 100.

Meanwhile, the malicious code diagnosing system 200 according to the present disclosure as described above may be embodied in the form of an application, installed on a computer system, and perform the above-stated operations according to the present disclosure.

Figure 2:
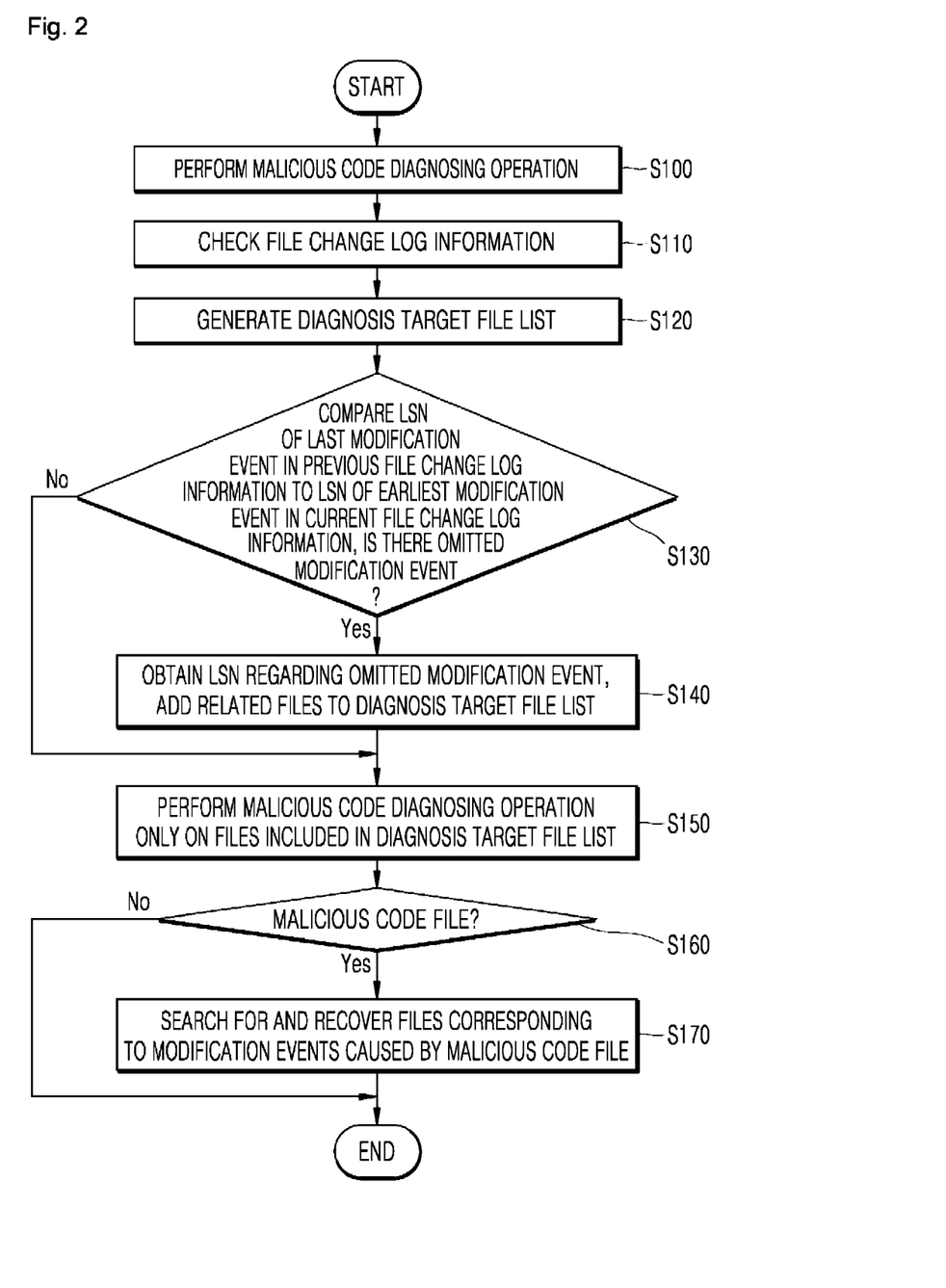
FIG. 2 is a flowchart showing a method of diagnosing malicious codes according to an exemplary embodiment of the present disclosure.

Hereinafter, referring to FIG. 2, a method of diagnosing malicious codes according to an exemplary embodiment will be described. Here, for convenience of explanation, the above-stated components shown in FIG. 1 will be denoted by the same reference numerals.

According to the method of diagnosing malicious codes according to the present disclosure, when a malicious code diagnosing operation is performed at a computer system (not shown) (operation S100), file change log information recorded in the file system 100 in the computer system (not shown) is checked (operation S110).

For example, a malicious code diagnosing operation may be performed on a computer system (not shown) upon a user's manual operation or at predetermined diagnosing cycles set to a diagnosing engine.

Therefore, according to the method of diagnosing malicious codes according to the present disclosure, when a malicious code diagnosing operation is performed on a computer system (not shown), file change log information recorded in the file change log information area 102 in the file system 100 may be checked.

Here, according to the method of diagnosing malicious codes according to the present disclosure, information regarding the last file change log information referred to in a previous malicious code diagnosing operation before a current malicious code diagnosing operation is performed (e.g., the last file change log information checked before the current malicious code diagnosing operation is performed) may be stored and managed.

Therefore, according to the method of diagnosing malicious codes according to the present disclosure, modification events regarding files that have been already diagnosed in a previous malicious code diagnosing operation may be excluded from among modification events included in file change log information recorded in the file change log information area 102 in the file system 100 based on the last file change log information when the malicious code diagnosing operation is performed in the operation S110, and thus file change log information regarding only modification events to be diagnosed may be checked.

According to the method of diagnosing malicious codes according to the present disclosure, a diagnosis target file list regarding files corresponding to the modification events from among all files of the file system 100 is generated with reference to the file change log information checked in the operation S110 (operation S120).

For example, according to the method of diagnosing malicious codes according to the present disclosure, files corresponding to modification events from among all files of the file system 100 are added to a diagnosis target file list based on file change log information checked in the operation S110, e.g., file change log information recorded in the file change log information area 102 in the file system 100 from which modification events regarding files that are already diagnosed are excluded at a time of performing a malicious code diagnosing operation.

In detail, according to the method of diagnosing malicious codes according to the present disclosure, based on file change log information, file identification information (e.g., File IDs) of respective modification events included in the file change log information may be checked and a diagnosis target file list may be generated by using the file identification information (e.g., File IDs) checked with respect to the respective modification events or the file identification information (e.g., File IDs) checked with respect to the respective modification events may be added to a diagnosis target file list that is generated in advance.

Here, according to the method of diagnosing malicious codes according to the present disclosure, it may be determined whether there is an omitted modification event between the current malicious code diagnosing operation and the last malicious code diagnosing operation before the current malicious code diagnosing operation is performed (operation S130).

In detail, according to the method of diagnosing malicious codes according to the present disclosure, log identification information regarding the earliest modification event in the current file change log information checked in the operation S110 is checked.

Next, according to the method of diagnosing malicious codes according to the present disclosure, log identification information regarding the last modification event in previous file change log information checked in the last malicious code diagnosing operation before the current malicious code diagnosing operation is performed, that is, the malicious code diagnosing operation just before the current malicious code diagnosing operation.

Therefore, according to method of diagnosing malicious codes according to the present disclosure, it may be determined whether there is an omitted modification event in the currently provided file change log information between a time point at which the previous malicious code diagnosing operation is performed and a time point at which the current malicious code diagnosing operation is performed by comparing log identification information regarding the earliest modification event of the current file change log information to log identification information regarding the last modification event in the file change log information regarding the malicious code diagnosing operation just before the current malicious code diagnosing operation.

For example, according to the method of diagnosing malicious codes according to the present disclosure, if the LSN regarding the earliest modification event of the current file change log information is a value smaller than the LSN corresponding to the last modification event of the file change log information regarding the malicious code diagnosing operation just before the current malicious code diagnosing operation or greater than the LSN corresponding to the last modification event of the file change log information regarding the malicious code diagnosing operation just before the current malicious code diagnosing operation and the difference therebetween exceeds a pre-set critical difference range, it may be determined that there is an omitted modification event between the time point at which the previous malicious code diagnosing operation is performed and the time point at which the current malicious code diagnosing operation is performed.

According to the method of diagnosing malicious codes according to the present disclosure, if it is determined as a result of the determination in the operation S130 that there is an omitted modification event, log identification information regarding the omitted modification event is obtained based on the LSN regarding the earliest modification event in the current file change log information and the LSN regarding the last modification event in the file change log information regarding the malicious code diagnosing operation just before the current malicious code diagnosing operation.

For example, according to the method of diagnosing malicious codes according to the present disclosure, based on a different range designated by a log identification information designating algorithm and the above-stated both LSNs, a LSN regarding the omitted modification event between the both LSNs may be estimated and obtained. Furthermore, according to the method of diagnosing malicious codes according to the present disclosure, from among all files of the file system 100, files related to the LSN of the omitted modification event obtained as described above may be diagnosed and file identification information (File IDs) regarding the diagnosed files may be added to a diagnosis target file list (operation S140).

Next, according to the method of diagnosing malicious codes according to the present disclosure, from among the all files of the file system 100, only files included in the diagnosis target file list are diagnosed for malicious codes (operation S150).

In other words, according to the method of diagnosing malicious codes according to the present disclosure, from among the all files of the file system 100, only files corresponding to respective file identification information (File IDs) included in the diagnosis target file list are searched for and diagnosed for malicious codes.

In other words, according to the method of diagnosing malicious codes according to the present disclosure, not all files of the file system 100 are diagnosed for malicious codes. Instead, only files corresponding to modifications, such as generation, modification, and deletion, in the file system 100 (moreover, files that are not diagnosed during a previous malicious code diagnosing operation) are diagnosed for malicious codes based on a diagnosis target file list regarding the files corresponding to modifications. For example, a malicious code diagnosing operation may be performed based on log information mapped to corresponding modification events of the files corresponding to modifications.

Here, according to the method of diagnosing malicious codes according to the present disclosure, if a particular file is diagnosed (determined) as a malicious code file as a result of performing a malicious code diagnosing operation as described above (operation S160 Yes), files corresponding to modification events caused by the above-stated particular file are searched for based on log information mapped to the respective modification events of the above-stated current file change log information.

Next, according to the method of diagnosing malicious codes according to the present disclosure, found files are recovered by using log information regarding the found files, and thus files modified (generated, modified, or deleted) by the particular file, which is a malicious code file, may be recovered and cured (operation S170).

For example, it is assumed that, as a result of performing a malicious code diagnosing operation, a particular file A is diagnosed as a malicious code file and, as a result of searching for files corresponding to modification events caused by the file A based on log information mapped to the respective modification events of the above-stated current file change log information, a file B and a file C are found.

Log information in file change log information regarding the file B may include information regarding type of a corresponding modification event (e.g., deletion), information regarding name of the file B (e.g., before the modification), information regarding location of the file B (e.g., before the modification), and information regarding size of the file B (e.g., before the modification), and information regarding the subject (the file A) of the modification event.

Furthermore, log information in file change log information regarding the file C may include information regarding type of a corresponding modification event (e.g., filename modification), information regarding name of the file C (e.g., before the modification), information regarding location of the file C (e.g., before the modification), and information regarding size of the file C (e.g., before the modification), and information regarding the subject (the file A) of the modification event.

In this case, according to the method of diagnosing malicious codes according to the present disclosure, the file B deleted by the malicious code file A may be recovered by using the log information regarding the found files B and C, filename of the file C, which is modified by the malicious code file A, may be modified to the filename before the modification, and, if necessary, the files B and C may be cured.

As described above, according to the method of diagnosing malicious codes according to the present disclosure, a quick and reliable malicious code diagnosing operation may be performed with respect to only files that are likely be infested by malicious codes by generating a diagnosis target file list regarding only files corresponding to modifications in the file system 100, such as modification of file-related information, generation of files, modification of files, and deletion of files, by utilizing file change log information recorded in the file system 100 and diagnosing only the files corresponding to the modifications for malicious code instead of diagnosing all files of the file system 100.

The method of diagnosing malicious codes according to an embodiment of the present disclosure may be implemented as computer instructions which can be executed by various computer means, and recorded on a computer-readable medium. The computer-readable medium may include program commands, data files, data structures or a combination thereof. Program instructions recorded on the medium may be particularly designed and structured for the present disclosure or available to those skilled in computer software. Examples of the computer-readable recording medium include magnetic media, such as a hard disk, a floppy disk, and a magnetic tape; optical media, such as a compact disk-read only memory (CD-ROM) and a digital versatile disc (DVD); magneto-optical media, such as floptical disks; a read-only memory (ROM); a random access memory (RAM); and a flash memory. The medium may be a transmission medium, such as an optical or metal line, a waveguide, or carrier waves transferring program commands, data structures, and the like. Program commands may include, for example, a high-level language code that can be executed by a computer using an interpreter, as well as a machine language code made by a complier. Hardware described herein may be embodied as one or more software modules to implement the present disclosure, and vice versa.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

The invention claimed is:

1. A method of diagnosing malicious codes, the method implemented by instructions on a non-transitory computer-readable medium for performing step of:
   a file change log information checking operation for checking file change log information recorded in a file system in a computer system when a malicious code diagnosing operation is performed on the computer system;
   a diagnosis target file list generating operation for generating a diagnosis target file list regarding files corresponding to modification events from among all files of the file system based on the file change log information;
   a diagnosing operation for performing the malicious code diagnosing operation only on files included in the diagnosis target file list,
      wherein the file change log information is information in which at least one of log identification information, log information, and file identification information regarding a file at which a corresponding modification event has occurred is mapped to at least one modification event that occurred in the file system, and,
      wherein in the diagnosis target file list generating operation, file identification information regarding the respective modification events included in the file change log information is checked based on the file change log information and the diagnosis target file list is generated by using the file identification information checked with respect to the respective modification events;
   a log identification checking operation for checking log identification information regarding the earliest modification event in current file change log information and log identification information regarding the last modification event in previous file change log information that is checked during the last malicious code diagnosing operation before the current malicious code diagnosing operation is performed; and
   an omitted modification event determining operation for determining whether there is an omitted modification event in the current file change log information between a time point at which the previous malicious code diagnosing operation is performed and a time point at which the current malicious code diagnosing operation is performed by comparing the log identification information regarding the earliest modification event checked in the current file change log information to log identification information regarding the last modification event checked in the previous file change log information.

2. The method of claim 1, further comprising:
   if it is determined that there is the omitted modification event, obtaining log identification information regarding the omitted modification event based on the log identification information regarding the earliest modification event and the log identification information regarding the last modification event; and,
   from among all files of the file system, identifying files related to the obtained log identification information of the omitted modification event and adding file identification information regarding the identified files to the diagnosis target file list.

3. The method of claim 1, wherein, in the diagnosing operation, with respect to files corresponding to deletion modification event from among the files included in the diagnosis target file list, the malicious code diagnosing operation is performed based on log information mapped to the deletion modification event or the malicious code diagnosing operation is performed after the file is recovered.

4. The method of claim 1, wherein the log information mapped to the respective modification events of the file change log information comprises information regarding a subject that caused modifications of files,
   further comprising:
   if it is determined as a result of performing the malicious code diagnosing operation that a particular file is a malicious code file, searching for files corresponding to modification events caused by the particular file based on log information mapped to the respective modification events of the file change log information; and
   recovering found files by using log information regarding the found files.

5. A malicious code diagnosis system implemented by execution of instructions on a non-transitory computer-readable medium, said system comprising:
   a file change log information checking unit, which checks file change log information recorded in a file system in a computer system when a malicious code diagnosing operation is performed on the computer system;
   a diagnosis target file list generating unit, which generates a diagnosis target file list regarding files corresponding to modification events from among all files of the file system based on the file change log information;
   a diagnosing unit, which performs the malicious code diagnosing operation with respect to only files included in the diagnosis target file list,
      wherein the file change log information is information including at least one of log identification information, log information, and file identification information regarding a file at which a corresponding modification occurred is mapped to at least one modification event occurred in the file system, and, wherein the diagnosis target file list generating unit checks file identification information regarding the respective modification events included in the file change log information based on the file change log information and generates the diagnosis target file list by using the file identification information checked with respect to the respective modification events; and a modification event omission determining unit, which checks log identification information regarding the earliest modification event in current file change log information, checks log identification information regarding the last modification event in previous file change log information that is checked during the last malicious code diagnosing operation before the current malicious code diagnosing operation is performed, and determines whether there is an omitted modification event in the current file change log information between a time point at which the previous malicious code diagnosing operation is performed and a time point at which the current malicious code diagnosing operation is performed by comparing the log identification information regarding the earliest modification event checked in the current file change log information to log identification information regarding the last modification event checked in the previous file change log information.

6. The system of claim 5, wherein, if it is determined that there is the omitted modification event, the modification event omission determining unit obtains log identification information regarding the omitted modification event based on the log identification information regarding the earliest modification event and the log identification information regarding the last modification event; and, from among all files of the file system, the modification event omission determining unit identifies files related to the obtained log identification information of the omitted modification event and requests to add file identification information regarding the identified files to the diagnosis target file list.

7. The system of claim 5, wherein the log information mapped to the respective modification events of the file change log information comprises information regarding a subject that caused modifications of files, further comprising a file recovering/curing unit, which, if it is determined as a result of performing the malicious code diagnosing operation that a particular file is a malicious code file, searches for files corresponding to modification events caused by the particular file based on log information mapped to the respective modification events of the current file change log information and recovers found files by using log information regarding the found files.

8. A non-transitory computer-readable recording medium having stored thereon a computer program that causes a computer to perform the steps of:

a file change log information checking operation for checking file change log information recorded in a file system in a computer system when a malicious code diagnosing operation is performed on the computer system;

a diagnosis target file list generating operation for generating a diagnosis target file list regarding files corresponding to modification events from among all files of the file system based on the file change log information;

a diagnosing operation for performing the malicious code diagnosing operation only on files included in the diagnosis target file list, wherein the file change log information is information in which at least one of log identification information, log information, and file identification information regarding a file at which a corresponding modification event has occurred is mapped to at least one modification event that occurred in the file system, and, wherein in the diagnosis target file list generating operation, file identification information regarding the respective modification events included in the file change log information is checked based on the file change log information and the diagnosis target file list is generated by using the file identification information checked with respect to the respective modification events;

a log identification checking operation for checking log identification information regarding the earliest modification event in current file change log information and log identification information regarding the last modification event in previous file change log information that is checked during the last malicious code diagnosing operation before the current malicious code diagnosing operation is performed; and an omitted modification event determining operation for determining whether there is an omitted modification event in the current file change log information between a time point at which the previous malicious code diagnosing operation is performed and a time point at which the current malicious code diagnosing operation is performed by comparing the log identification information regarding the earliest modification event checked in the current file change log information to log identification information regarding the last modification event checked in the previous file change log information.

9. The non-transitory computer-readable recording medium of claim 8, wherein the computer program causes the computer to perform the further steps of:

if it is determined that there is the omitted modification event, obtaining log identification information regarding the omitted modification event based on the log identification information regarding the earliest modification event and the log identification information regarding the last modification event; and, from among all files of the file system, identifying files related to the obtained log identification information of the omitted modification event and adding file identification information regarding the identified files to the diagnosis target file list.

10. The non-transitory computer-readable recording medium of claim 8, wherein, in the diagnosing operation, with respect to files corresponding to deletion modification event from among the files included in the diagnosis target file list, the malicious code diagnosing operation is performed based on log information mapped to the deletion modification event or the malicious code diagnosing operation is performed after the file is recovered.

11. The non-transitory computer-readable recording medium of claim 8, wherein the log information mapped to the respective modification events of the file change log information comprises information regarding a subject that caused modifications of files, and wherein the computer program causes the computer to perform the further steps of:

if it is determined as a result of performing the malicious code diagnosing operation that a particular file is a malicious code file, searching for files corresponding to modification events caused by the particular file based on log information mapped to the respective modification events of the file change log information; and recovering found files by using log information regarding the found files.

\* \* \* \* \*